United States Patent [19]

Tydings

[11] 4,352,542
[45] Oct. 5, 1982

[54] CABLE CONNECTOR

[75] Inventor: John E. Tydings, Rockville, Md.

[73] Assignee: The United States of America as represented by the Secretary of the Navy, Washington, D.C.

[21] Appl. No.: 181,524

[22] Filed: Aug. 26, 1980

[51] Int. Cl.³ .............................................. G02B 5/14
[52] U.S. Cl. ................................. 350/96.21; 403/300; 403/273
[58] Field of Search ............... 403/372, 366, 314, 300, 403/273; 138/113, 114; 350/96.21, 96.22

[56] References Cited

U.S. PATENT DOCUMENTS

| 2,551,710 | 5/1951 | Slaughter | 138/113 UX |
| 4,090,778 | 5/1978 | Phillips | 350/96.21 X |
| 4,134,641 | 1/1979 | Kao et al. | 350/96.21 |
| 4,148,553 | 4/1979 | Asam | 350/96.21 |
| 4,193,665 | 3/1980 | Arnold | 350/96.21 X |
| 4,261,644 | 4/1981 | Giannaris | 350/96.21 |

Primary Examiner—Andrew Kundrat
Attorney, Agent, or Firm—R. S. Sciascia; A. L. Branning; W. R. Henderson

[57] ABSTRACT

A connector for joining a fiber optic cable. The connector is constructed with a thin wall tube enclosing strips of a shape memory alloy material. The strips are bent and inserted into the thin wall tube such that an axial cavity is formed between the opposing strips. The axial cavity provides a self-centering mechanism for positioning fiber optic cables along the central axis of the tube. Dimensions of the tube and shape memory alloy strips are chosen such that fiber optic cables inserted into each end of the connector when it is above the transition temperature range of the strips will be forced into coaxial alignment when the connector is cooled to a temperature below the transition range of the strips.

13 Claims, 7 Drawing Figures

CABLE CONNECTOR

BACKGROUND OF THE INVENTION

The present invention relates to a connector for fiber optic cables and more particularly to a fiber optic cable connector which provides a simple, accurate, and inexpensive method for joining fiber optic cables.

To minimize losses caused by cable splices and connections between cables and interface equipment, means must be provided to accurately align the axis of the optical elements to be joined. This is currently being done in a variety of ways including precision drill connectors fabricated from jewels or metallic components, various v-groove schemes utilizing both mechanical and adhesive joining techniques, and direct fuzing of the fiber optical elements. The connector of the present invention provides accurate alignment, adequate clamping force to maintain position of the joined fibers, is reversible, and can be reused without damaging the fiber optic cable ends or the connectors.

SUMMARY OF THE INVENTION

Accordingly, there is provided in the present invention a fiber optic connector that provides a simple, accurate, and inexpensive method for joining fiber optic cables.

The connector is constructed with a thin wall tube of beryllium copper enclosing three strips of a shaped memory alloy material such as nitinol alloy. The three strips are bent and inserted into the thin wall tube such that an axial cavity is formed between the three opposing bent radii of the strips thus providing a self-centering mechanism for positioning fiber optic cable ends along the central axis of the tube.

When the assembled connector is heated, the bent strips attempt to return to the flat memory configuration and, in doing so, distort the beryllium copper tube into a three-lobed shape and simultaneously enlarge the axial cavity. By choosing the proper width and thickness of the nitinol strips in relation to the stiffness of the beryllium copper tubing, a connector can be achieved which will open the axial cavity between fifty to eighty percent when the connector is heated above the transition range of the nitinol strips.

After heating the connector above the transition temperature range of the nitinol strips, fiber optic cables are inserted into each end of the connector. The connector is then permitted to cool to below the transition temperature range, the nitinol strips return to their bent shape, and the fiber optic cable ends are forced into coaxial alignment.

OBJECTS OF THE INVENTION

It is an object of the present invention to provide a fiber optic connector for aligning and connecting the ends of fiber optic cables.

Another object is to provide a connector for fiber optic cables which is simple, accurate, and inexpensive to produce.

Another object is to provide a connector for fiber optic cables which provides for accurate alignment of the cable ends.

Yet another object of the invention is to provide a connector for fiber optic cables having adequate clamping force to maintain position of the joined cables.

A still further object of the invention is to provide a connector for fiber optic cables which is reversible such that the connection can be taken apart without damaging the cable ends or the connector.

Other objects, advantages, and novel features of the present invention will become apparent from the following detailed description of the invention when considered in conjunction with the drawings.

BRIEF DESCRIPTION OF THE DRAWINGS

A more complete appreciation of the invention and many of the attendant advantages thereof will be readily understood by reference to the following detailed description when considered with the accompanying drawings in which like reference numerals designate like parts throughout the figures and wherein.

DESCRIPTION OF THE PREFERRED EMBODIMENTS

Figure 1:
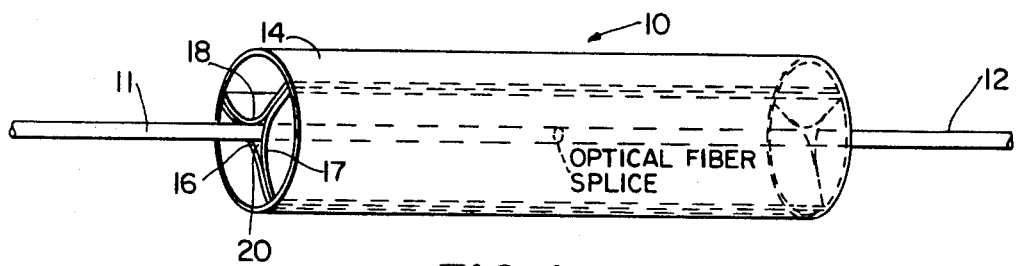
FIG. 1 shows a side elevation of the fiber optic cable connector of the subject invention.

Referring to FIG. 1, there is illustrated the connector 10 of the subject invention joining fiber optic cables 11 and 12. Connector 10 is constructed with thin wall hollow tube 14 of a suitable material such as beryllium copper. Thin wall tube 14 encloses three bent strips of a shape memory alloy material 16, 17, and 18.

Shape memory alloy strips 16, 17, and 18 have a flat memory configuration and are sized and then bent into an arcuate shape to fit into thin wall tube 14 in the configuration shown. After insertion into tube 14, strips 17, and 18 form axial cavity 20 therebetween. The axial cavity is formed between the three opposing radii of the strips and provides a self-centering mechanism for positioning the fiber optic cables as illustrated in FIG. 1. The ends of fiber optic cables 11 and 12 are inserted into axial cavity 20 of connector 10 and will thus have their axes made coincident and parallel by the mutual lines of tangency between the bent strips and the cylindrical fiber optic cables. Axial cavity 20 can be made to expand and contract by fabricating strips 16, 17, and 18 from a suitable shape memory alloy such as nitinol.

Nitinol alloys (intermetallic compounds formed from nickel and titanium,) possess a mechanical memory by virtue of a Martensitic-austenitic transition which occurs over a relatively narrow transition temperature range (TTR). When wrought samples of this material are heat-treated at a prescribed annealing temperature, the configuration of the sample during its anneal, whether flat, bent, coiled, etc., becomes its memory shape. If the annealed material is then plastically (permanently) deformed at some temperature below the TTR, and the deformation strains are limited to 6–8%, it can be made to return to its memory shape by heating to a temperature above the TTR. In addition, the mechanical properties of the shape memory alloy are markedly different below and above the TTR. The low temperature phase of the material can be characterized as weak and compliant (low yield strength and low elastic modulus) while in the high temperature phase (above the TTR) the material becomes moderately stiff and strong. Thus the nitinol can exert substantial force against external constraints while attempting to recover to the memory shape.

Figure 2A:
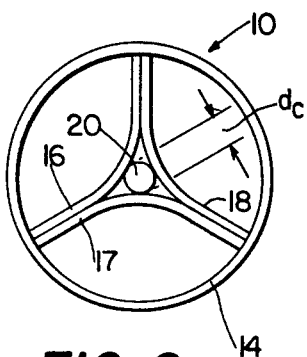
FIGS. 2a, 2b, and 2c illustrate the operation of the connector of the subject invention.
Figure 2B:
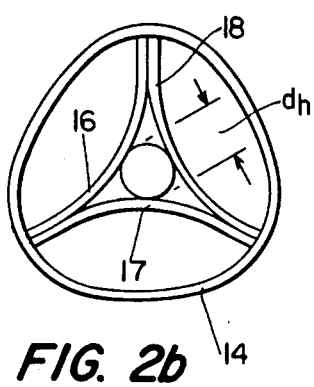
Figure 2C:
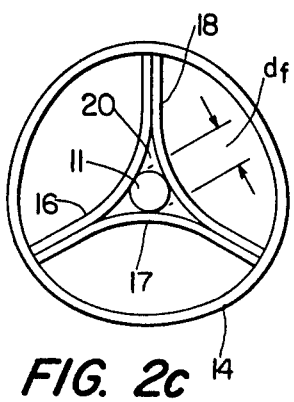

Referring to FIGS. 2a, 2b, and 2c there is illustrated the operation of connector 10. In the cold state, illustrated in FIG. 2a, thin wall tube 14 exerts enough force on bent strips 16, 17, and 18 to force them to collapse toward the center of tube 14 when the strips are below their TTR. Axial cavity 20 has a cold diameter $d_c$. The force exerted by tube 14 on the strips is used to grip and align the fiber optic cable inserted in axial cavity 20. When connector 14 is heated to above the TTR of the strips, illustrated in FIG. 2b, enough force can be applied to the tube by the strips in attempting to return to their flat shape memory to deform the tube to a three-lobed shape. The deformation of tube 14 by the strips expands axial cavity 20 to a hot diameter $d_h$ which is greater than the cold diameter $d_c$. In the expanded or hot state, fiber optic cables 11 and 12 can be inserted into axial cavity 20 and will be securely held in cavity 20 when connector 10 is allowed to cool, as illustrated in FIG. 2c. For connector 10 to securely grip cables 11 and 12, the fiber optic cable diameter $d_f$ must be greater than the cold diameter $d_c$ of axial cavity 20. Although strips 16, 17 and 18 are disclosed as constructed of nitinol alloy, it is to be understood that any equivalent shape metal alloy such as beta brass, copper aluminum, or other equivalent material could be used for the strip. It is also contemplated that tube 14 can be constructed of shape memory alloy having a lobe memory shape and the strips can be constructed of beryllium copper or equivalent non-memory shape material.

The operation of connector 10 is dependent on a compromise between tube material, tube dimensions, tube elastic properties, and the thickness and width of the nitinol strips. In fabricated models, beryllium copper tubing has been used in conjunction with nitinol material with a TTR of approximately 170° F. For a constant tube size of 0.0853 I.D. x 0.0895 O.D., a range of cavity sizes has been achieved by holding the width of the nitinol strips constant and varying the thickness of the material from which the strips are formed, as illustrated in Table 1. Sizes are wire diameters readily accepted by the axial cavity of the coupler.

TABLE 1

| | Thickness of strip at constant 83 mil width | | | |
|---|---|---|---|---|
| | 1.7 | 2.3 | 3.0 | 3.4 |
| Cold size | 7 | 8 | 11 | 13 |
| Hot size | 10 | 12 | 16 | 20 |

All sizes are in mils ($10^{-3}$ inches)

Figure 7:
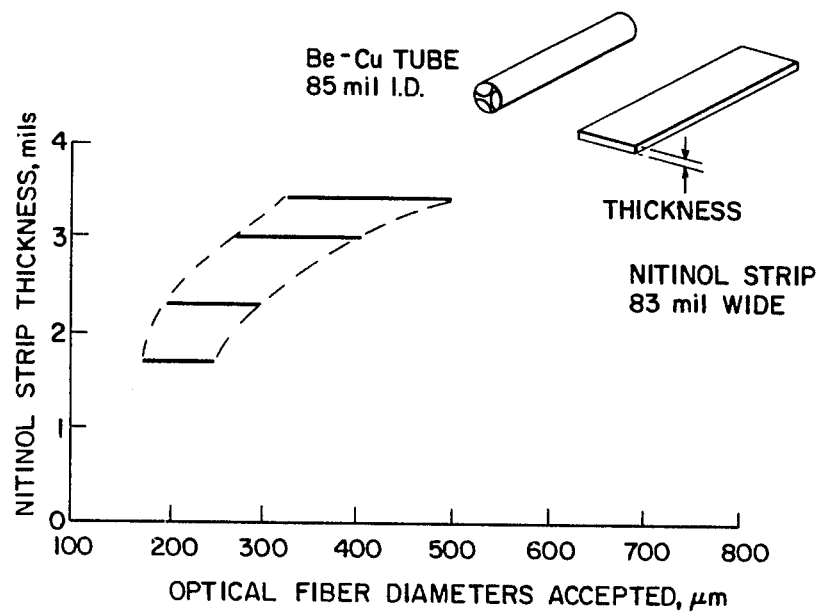
FIG. 7 illustrates a design graph of optical fiber diameters accepted by the connector versus nitinol strip thickness.

FIG. 7 illustrates a graph of connector design with optical fiber diameters accepted by the connector versus nitinol strip thickness for strips having a width of 83 mils.

In experiments with the same size tubing, the effect of varying the width of the strip was investigated: nitinol strips having a thickness of 3 mils and a width of 80 mils were found to have a cold size of 20 mils and a hot size of 31 mils as opposed to 11 and 16 mils obtained with the nitinol strip having a width of 83 mils. Thus a wide range in size of optical fibers accepted by the connector can be obtained if proper dimensioning of the tubing and strips is achieved.

Figure 6:
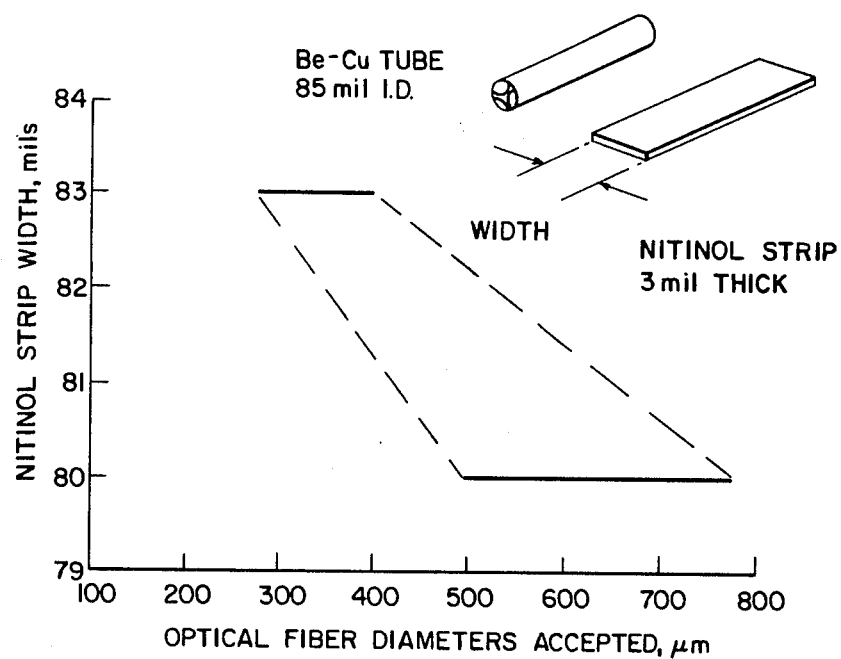
FIG. 6 illustrates a design graph of optical fiber diameters accepted by the connector versus nitinol strip width.

FIG. 6 illustrates a graph of connector design with optical fibers accepted by the connector versus nitinol strip width for strips having a thickness of 3 mils. This illustrates that for a connector fashioned from three 83 mil wide strips the fiber size acceptance rang is from 275→400 μm and reducing the strip width to 80 mils yields a connector whose range varies from 500→800 μm. A similar graph, FIG. 7, illustrates the range in fiber size acceptance for connectors in which the strip width was held constant at 83 mils while the strip thickness was varied.

Figure 3:
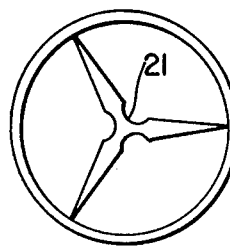
FIG. 3 illustrates a second embodiment of the fiber optic cable connector.

For connectors to be used on fiber optic cables having a diameter less than 250 micrometers, an additional cylindrical ridge 21 is impressed in each nitinol strip during the memory anneal, as illustrated in FIG. 3. Cylindrical ridge 21 serves as an aid in achieving operation of the connector on cables having a diameter less than 250 micrometers. After annealing, the nitinol strips are bent along their lengths to approximately a 120° included angle for insertion in tube 14.

Figure 4:
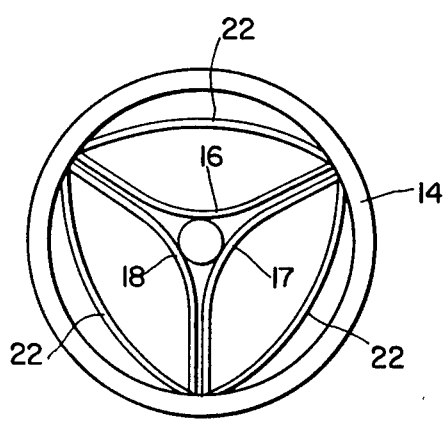
FIG. 4 illustrates a third embodiment of the fiber optic cable connector.

If an increase in the clamping force exerted on the fiber optic cable is desired, the tubing wall/diameter ratio of tube 14 can be increased to provide a stiffer tube. A point is reached in tube stiffness, however, where the strips can not exert sufficient force to flex the tube and enlarge cavity 20. Additional strips 22 can be added to connector 10 to overcome the tube resistance, as illustrated in FIG. 4. The embodiment of the connector illustrated in FIG. 4 can also be used on connectors for fibers down to 5 mils in diameter. For these small fiber sizes, a relatively small bend radius in the strip is required for geometric reasons and this dictates using strip thickness on the order of 2 mils. The thinner material exerts less recovery force and additional strips are necessary to allow the connector to expand axial cavity 20.

Figure 5:
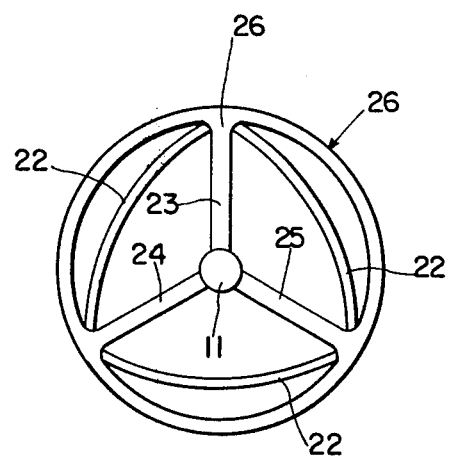
FIG. 5 illustrates a fourth embodiment of the fiber optic cable connector.

FIG. 5 illustrates that additional strips 22 can also be used as the active memory element in a connector with non memory materials. In the embodiment of FIG. 5 shape memory strips 16, 17, and 18 are replaced with centering arms 23, 24, and 25 of tube 26 constructed of non-memory shape material.

It is thus apparent that the disclosed connector for fiber optic cables provides a simple, accurate, and inexpensive method for joining fiber optic cables. The connector minimizes losses caused by cable splices and connections between cables and interface equipment, accurately aligns the axis of the optical elements to be joined, provides adequate clamping force to maintain position of the joined fibers, is reversible, and provides for removal of the connector without damaging the cable end or the connector.

Many obvious modifications and embodiments of the specific invention other than those set forth above, will readily come to mind to one skilled in the art having the benefit of the teaching presented in the foregoing description and the accompanying drawings of the subject invention and hence it is to be understood that such modifications are included within the scope of the appended claims.

What is claimed as new and desired to be secured by Letters Patent of the United States is:

1. A connector for joining opposing cable ends, comprising:
   support means; and shape memory means supported by the support means so as to align and hold the cable ends, said shape memory means comprising strips of a shape memory alloy.

2. A connector as in claim 1 wherein the support means is a tube and the shape memory means are positioned in the tube to form an axial cavity.

3. A connector as in claim 2 wherein the shape memory means are arcuately positioned in the tube to form an axial cavity.

4. A connector as in claim 3 wherein the strips are provided with ridges.

5. A connector as in claim 3 wherein the shape memory means further comprises centering arms.

6. A connector as in claim 5 wherein the centering arms are of a non-shape memory material.

7. A connector as in claim 3 wherein the strips comprise centering strips which form the axial cavity and additional strips to increase the force of the centering strips.

8. A connector as in claim 3 wherein the tube is beryllium copper and the shape memory alloy is selected from the group consisting of nickel-titanium, Beta Brass or Copper-Aluminum.

9. A connector as in claim 1 wherein the support means is a tube of shape memory alloy.

10. A connector as in claims 3, 4, 6, 7, 8 or 9 wherein the cable ends are fiber optic cable ends.

11. A connector for joining opposing cable ends, comprising:
support means constructed of a tube of shape memory alloy; and
strips of non-shape memory alloy arcuately positioned in the support means to form inwardly directed radii encompassing an axial cavity.

12. A connector as in claim 11 wherein the strips are shape memory alloy.

13. A connector as in claim 11 further provided with centering arms.

* * * * *